(12) United States Patent
Yamasaki et al.

(10) Patent No.: US 7,575,684 B2
(45) Date of Patent: Aug. 18, 2009

(54) WASTE WATER TREATMENT APPARATUS AND WASTE WATER TREATMENT METHOD

(75) Inventors: Kazuyuki Yamasaki, Hiroshima (JP); Kazuyuki Sakata, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 532 days.

(21) Appl. No.: 11/519,224

(22) Filed: Sep. 12, 2006

(65) Prior Publication Data

US 2009/0101573 A1 Apr. 23, 2009

(30) Foreign Application Priority Data

Dec. 16, 2005 (JP) ................ 2005-363791

(51) Int. Cl.
*C02F 3/30* (2006.01)
(52) U.S. Cl. ............... 210/605; 210/623; 210/631; 210/259; 210/903
(58) Field of Classification Search ............... 210/605, 210/609, 620, 621, 623, 630, 631, 252, 259, 210/903
See application file for complete search history.

(56) References Cited

U.S. PATENT DOCUMENTS 5,578,214 A * 11/1996 Yamasaki et al. ......... 210/650
6,261,456 B1 * 7/2001 Yamasaki et al. ......... 210/605
6,863,817 B2 * 3/2005 Liu et al. ................ 210/605

FOREIGN PATENT DOCUMENTS

| JP | 11-000693 A | * | 1/1999 |
| JP | 3095620 | | 8/2000 |
| JP | 3467671 | | 9/2003 |
| JP | 2003-334548 | | 11/2003 |
| JP | 2004-121962 | | 4/2004 |
| JP | 2004-321959 | | 11/2004 |

\* cited by examiner

*Primary Examiner*—Fred Prince
(74) *Attorney, Agent, or Firm*—Nixon & Vanderhye P.C.

(57) ABSTRACT

In waste water treatment apparatus and method, a mineral mixing tank receives biologically treated water, sludge which is generated by biological treatment, and mineral sludge which contains calcium and so on from a settling tank. A mineral pump returns the sludge and the treated water from the mineral mixing tank to a raw water tank. An air-lift pump circulates treatment water between a reaeration tank having a semi-anaerobic section and a denitrification tank. In circulation of the treatment water between the reaeration tank and the denitrification tank, the semi-anaerobic section alleviates the change of environment for microorganisms and thereby realizes the environment easy to propagate for the microorganisms. The air-lift pump allows the agitation with low energy consumption even when the microorganisms are cultured up to a high concentration thereof.

9 Claims, 6 Drawing Sheets

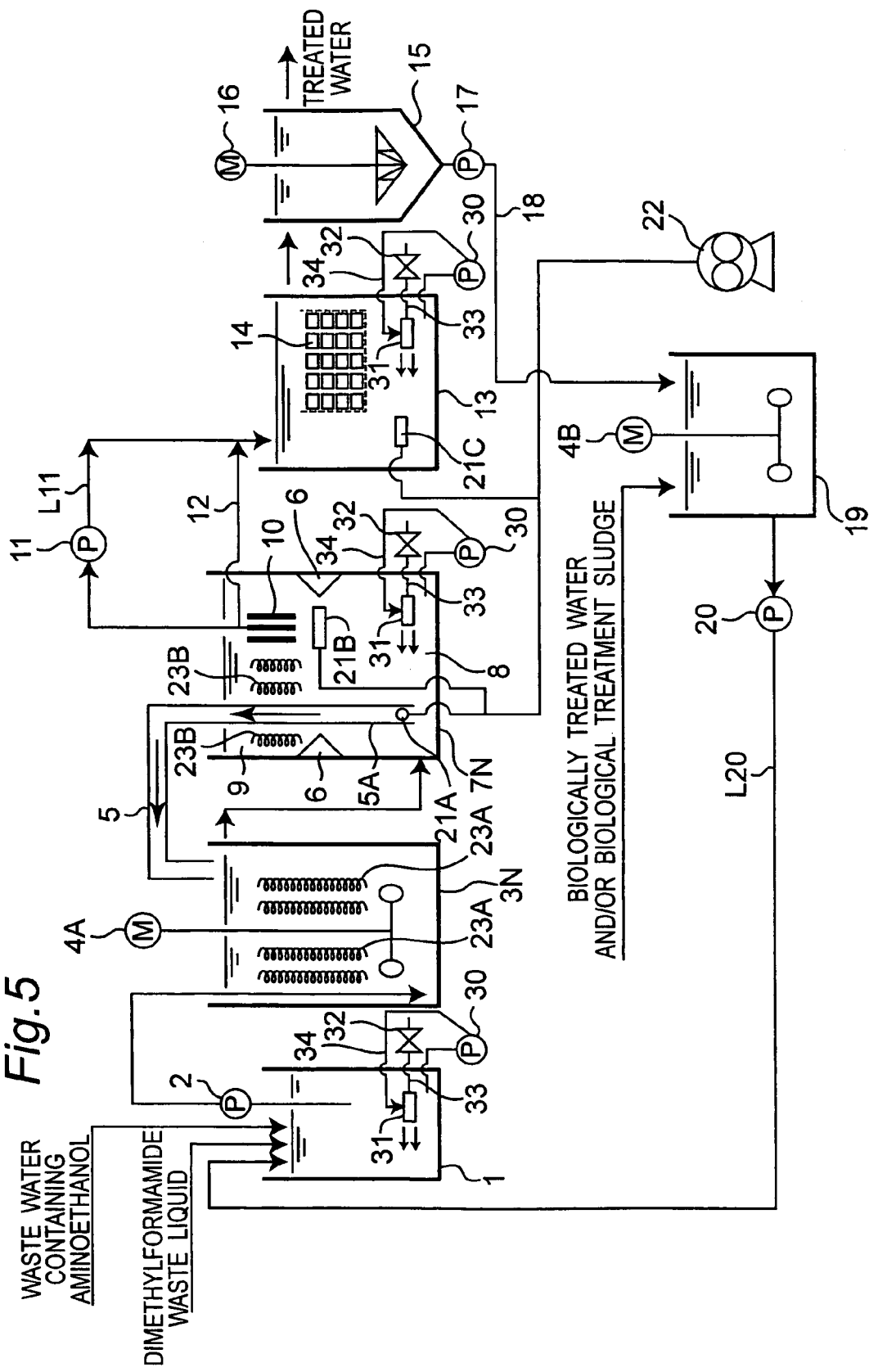

Fig.6A

NITROGEN CONCENTRATION : 3000 ppm

| TANK NAME | RESIDENCE TIME | TIMING(DAY) 1　2　3　4 |
|---|---|---|
| RAW WATER TANK | 0.5 DAY | — |
| DENITRIFICATION TANK | 1 DAY | 　— |
| REAERATION TANK | 2 DAYS | 　　—— |
| CONTACT OXIDATION TANK | 1 DAY | 　　　　— |
| SETTLING TANK | 0.5 DAY | 　　　　　- |

Fig.6B

NITROGEN CONCENTRATION : 6000ppm

| TANK NAME | RESIDENCE TIME | TIMING(DAY) 2　4　6　8 |
|---|---|---|
| RAW WATER TANK | 1 DAY | — |
| DENITRIFICATION TANK | 2 DAYS | 　— |
| REAERATION TANK | 4 DAYS | 　　—— |
| CONTACT OXIDATION TANK | 2 DAYS | 　　　　— |
| SETTLING TANK | 1 DAY | 　　　　　- |

WASTE WATER TREATMENT APPARATUS AND WASTE WATER TREATMENT METHOD

CROSS-REFERENCE TO RELATED APPLICATIONS

This nonprovisional application claims priority under 35 U.S.C. §119(a) on Patent Application No. 2005-363791 filed in Japan on 16 Dec. 2005, the entire contents of which are incorporated herein by reference.

BACKGROUND OF INVENTION

The present invention relates to a waste water treatment apparatus and a waste water treatment method. The present invention relates to a waste water treatment apparatus and a waste water treatment method, as an example, which meet the total volume of nitrogen in conformity to partial revisions to Water Pollution Control Law implemented as of April 2004, and the emission reduction of toxic substances in conformity to PRTR (Pollutant Release and Transfer Register) Law implemented as of April 2001 (aminoethanol is one of the first-class designated chemicals in PRTR Law). The present invention relates to a waste water treatment apparatus and a waste water treatment method, as another example, which can microbially treat waste water containing aminoethanol discharged mainly from semiconductor plants without any dilution, and therefore which are excellent in initial, running and maintaining costs.

Conventionally, it has been impossible in general to microbially treat waste water containing aminoethanol, for a specific example, waste water containing high concentration aminoethanol of about 3000 ppm because aminoethanol has high microbial toxicity.

Even in the case where the waste water containing aminoethanol has been microbially treated, the microbial treatment has generally been performed at such a low concentration of aminoethanol as several hundred ppm.

Accordingly, the waste water containing high concentration aminoethanol of 3000 ppm or more has been concentrated to about 1/10 quantitatively by using an evaporator as a physical method. Thereafter, the concentrated waste water has been disposed as industrial waste.

In the method where the waste water is concentrated by using the evaporator, the amount of industrial waste from a plant is increased since the concentrated waste water is discharged from the plant as industrial waste. Generally, industrial waste including the concentrated waste water is disposed by incineration. The incineration causes a problem of air pollution due to use of fuels such as heavy oils. Further, the treatment using the evaporator or the like consumes a large amount of energy and involves large plant equipment. Thus causes a problem of large initial costs, running costs and maintenance costs.

JP 3467671 discloses a biological treatment method as a prior art. This biological treatment method is a nitrification and denitrification method. In the nitrification and denitrification method, organic waste water in a raw water tank is fed to a denitrification tank and a nitrification tank in series by using liquid supply pumps. Also, the organic waste water is circulated between both the above-stated tanks so that ammonia nitrogen contained in the organic waste water is reduced to nitrogen gas by using biological nitrification and denitrification actions, and thereafter nitrogen gas is removed. Sludge and treated water are separated from each other by using a suction pump and a filtration membrane unit which is dipped in the waste water contained in the nitrification tank.

The feature of the nitrification and denitrification method is that part of organic waste water fed from the denitrification tank to the nitrification tank is ejected to the organic waste water in the denitrification tank, wherein a conduit pipe for supplying the waste water from the denitrification tank to the nitrification tank is diverged so as to open ends of a diverged branch pipe in the waste water of the denitrification tank.

JP 3095620 discloses another biological treatment method as another conventional art. The biological treatment method is a method performed by a biological nitrogen removing apparatus. The biological nitrogen removing apparatus has a denitrification tank for receiving inflow of raw water containing organic substances, a nitrification tank for receiving inflow of denitrification tank mixtures from the denitrification tank, a nitrified liquid circulation channel for circulating nitrified liquid of the nitrification tank to the denitrification tank, and a nitrification tank diffuser placed inside the nitrification tank.

More specifically, the biological nitrogen removing apparatus is provided with a denitrification-bacteria-immobilization-carrier-filled zone in the denitrification tank so as to catch and remove suspended solids in the raw water flowing into the denitrification tank. Also, a raw water introduction channel and a nitrified liquid circulation channel are linked to a lower position of the denitrification tank which position is located under the denitrification-bacteria-immobilization-carrier-filled zone. A sludge hopper section is provided on the bottom of the denitrification tank, so that suspended solids, which are caught and removed by the denitrification-bacteria-immobilization-carrier-filled zone, are accumulated in the sludge hopper section. Further, a hopper diffuser is provided in the sludge hopper section.

As stated above, conventionally, waste water containing such high concentration aminoethanol as around 3000 ppm has not been microbially treated because of high biological toxicity. Therefore, the waste water containing high concentration aminoethanol has been treated by using the above-mentioned concentration method.

In the concentration method, however, as stated above, there are the problems of heavy consumption in energy and increase in industrial waste of concentrated waste water.

BRIEF SUMMARY OF THE INVENTION

An object of the present invention is to provide a waste water treatment apparatus and a waste water treatment method capable of treating waste water containing high concentration aminoethanol and achieving energy saving and reduction of waste.

In order to achieve the above-mentioned object, the present invention provides a waste water treatment apparatus, comprising:

a raw water tank for receiving waste water containing aminoethanol;

a denitrification tank for receiving treatment water from the raw water tank;

a reaeration tank for receiving treatment water from the denitrification tank and having a semi-anaerobic section;

a contact oxidation tank for receiving treatment water from the reaeration tank and having a mineral source containing calcium;

a settling tank for receiving treatment water from the contact oxidation tank;

an air-lift pump for circulating treatment water from the reaeration tank to the denitrification tank;

a mineral mixing tank for receiving biologically treated water and/or sludge generated by biological treatment and mineral sludge containing calcium from the settling tank and for mixing the treated water and the mineral sludge; and a return section for returning the sludge and the treated water from the mineral mixing tank to the raw water tank.

According to the waste water treatment apparatus in the present invention, the mineral mixing tank receives the biologically treated water and/or the sludge generated by biological treatment and the mineral sludge containing calcium from the settling tank. Then, the sludge and the treated water in the mineral mixing tank are returned to the raw water tank by the return section.

Also, the treatment water is circulated between the reaeration tank having a semi-anaerobic section and the denitrification tank by using an air-lift pump. In the circulation of the treatment water between the reaeration tank and the denitrification tank, the semi-anaerobic section makes it possible to alleviate the change of environment for microorganisms and to thereby realize the environment easy to propagate for the microorganisms. As used herein, the treatment water is defined as water to be treated or treatment-receiving water.

Moreover, even when the microorganisms have been cultured up to such a high concentration that a normal agitator cannot agitate the treatment water, the air-lift pump allows agitation with low energy consumption.

Therefore, according to the waste water treatment apparatus of the present invention, it becomes possible to propagate the microorganisms at a high concentration with low energy consumption, thereby allowing treatment of waste water containing high concentration aminoethanol as well as energy saving and reduction of waste.

The present invention also provides a waste water treatment method, comprising the steps of:

introducing waste water containing aminoethanol to a raw water tank, a denitrification tank, a reaeration tank having a semi-anaerobic section, a contact oxidation tank and a settling tank in sequence;

circulating treatment water by an air-lift pump from the reaeration tank to the denitrification tank; and mixing biologically treated water and/or sludge generated by biological treatment and mineral sludge containing calcium from the settling tank in a mineral mixing tank, and returning a resultant mixture to the raw water tank.

According to the waste water treatment method of the present invention, as in the case of the above waste water treatment apparatus, the mineral mixing tank receives biologically treated water and/or sludge generated by biological treatment and mineral sludge containing calcium from the settling tank. The sludge and the treated water are returned from the mineral mixing tank to the raw water tank. With use of an air-lift pump, treatment water is circulated between the reaeration tank having a semi-anaerobic section and the denitrification tank. In the circulation between the reaeration tank and the denitrification tank, the semi-anaerobic section makes it possible to alleviate the change of environment for microorganisms and to thereby realize the environment easy to propagate for the microorganisms. Moreover, even when the microorganisms have been cultured up to such a high concentration that a normal agitator cannot agitate the treatment water, the air-lift pump allows agitation with low energy consumption. According to the waste water treatment method of the present invention, therefore, it becomes possible to propagate the microorganisms at high concentration with low energy consumption, thereby allowing treatment of waste water containing high concentration aminoethanol as well as energy saving and reduction of waste.

In one embodiment of the waste water treatment apparatus of the present invention, the reaeration tank has a submerged membrane, a pump-type pipe for introducing treatment water from the submerged membrane to the contact oxidation tank, and a gravity-type pipe for introducing treatment water from the submerged membrane to the contact oxidation tank.

According to the waste water treatment apparatus in the present embodiment, the reaeration tank has a submerged membrane, which can achieve high microbial concentration and microbially treat toxic substances. The reaeration tank has two types of pipes, that is, the pump-type pipe and the gravity-type pipe, so that even if one type of pipe is in trouble, the other type of pipe can be activated to continue the operation, thereby the waste water treatment system are stabilized. When the operation is implemented only with the gravity-type pipe, which requires no power, a considerable energy saving operation is achieved.

In one embodiment of the waste water treatment apparatus of the present invention, the denitrification tank and the reaeration tank have a polyvinylidene chloride filler material.

According to the waste water treatment apparatus in the present embodiment, both the denitrification tank and the reaeration tank have a polyvinylidene chloride filler material, so that it becomes possible to propagate microorganisms on each of the polyvinylidene chloride filler materials to maintain the microorganisms at high concentration. Therefore, the waste water treatment apparatus not only enhances the efficiency to decompose and treat aminoethanol but also has the effect to help the microorganisms stabilize. Moreover, the polyvinylidene chloride filler material can propagate aerobic microorganisms on its surface and anaerobic microorganisms in its inside so as to enhance the efficiency of the denitrification system.

In one embodiment of the waste water treatment apparatus of the present invention, the air-lift pump returns sludge from the semi-anaerobic section in the reaeration tank to the denitrification tank.

According to the waste water treatment apparatus in the present embodiment, the air-lift pump returns sludge from the semi-anaerobic section in the reaeration tank to the denitrification tank, and therefore compared to the case where the sludge in an aerobic section in the reaeration tank is returned to the denitrification tank, the anaerobic state in the denitrification tank can be maintained stable, and the effect to stabilize the denitrification and a reduction action from nitrite nitrogen to nitrogen gas is implemented.

In one embodiment of the waste water treatment method of the present invention, waste water containing aminoethanol and waste water containing ammonium are introduced into the raw water tank.

According to the waste water treatment method in the present embodiment, two kinds of waste water, that is, waste water containing aminoethanol and waste water containing ammonium, can simultaneously be treated, so that the cost for waste water treatment can be reduced.

In one embodiment of the waste water treatment method of the present invention, waste water containing aminoethanol and developer waste liquid are introduced into the raw water tank.

According to the waste water treatment method in the present embodiment, two kinds of waste water, that is, waste water containing aminoethanol and waste developer, can simultaneously be treated, so that the cost for waste water treatment can be reduced.

In one embodiment of the waste water treatment method of the present invention, wherein waste water containing aminoethanol and dimethylformamide waste liquid are introduced into the raw water tank.

According to the waste water treatment method in the present embodiment, two kinds of waste water, that is, waste water containing aminoethanol and dimethylformamide waste liquid, can simultaneously be treated, so that the cost for waste water treatment can be reduced.

In one embodiment of the waste water treatment apparatus of the present invention, at least one of the raw water tank, the reaeration tank and the contact oxidation tank is equipped with a micro-nano bubble generator.

According to the waste water treatment apparatus in the present embodiment, at least one of the raw water tank, the reaeration tank and the contact oxidation tank is equipped with a micro-nano bubble generator. When for example the raw water tank is equipped with the micro-nano bubble generator, the micro-nano bubble generator generates micro-nano bubbles in the raw water tank, so that waste water containing micro-nano bubbles can be produced in the raw water tank. This makes it possible to activate microorganisms in the microbial treatment in the subsequent denitrification tank, the reaeration tank and the contact oxidation tank and to thereby enhance the efficiency of microbial treatment.

When the reaeration tank is equipped with the micro-nano bubble generator, the microorganisms in the reaeration tank is effectively activated. When the contact oxidation tank is equipped with the micro-nano bubble generator, the microorganisms (e.g., microorganisms propagating on the filler material) in the contact oxidation can be activated. It should be noted that the micro-nano bubbles contain both micro bubbles (with a diameter of 50 μm or less) and nano bubbles (with a diameter of 1 μm or less). The micro bubbles can continuously be sustained in water for, for example, three to four minutes, while the nano bubbles can be maintained in water for, as an example, one month or more. Therefore, the micro-nano bubbles have a function to increase and maintain the dissolved oxygen in water. It is said that the nano bubbles directly act upon living organisms at a cell level and increase the activity of microorganisms in particular since nano bubbles have a diameter of 1 μm or less.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a schematic view showing a waste water treatment apparatus in a fifth embodiment of the present invention;

FIG. 6A is one example of a time chart in the first to the fifth embodiments in the case where the nitrogen concentration in waste water is approx. 3000 ppm; and FIG. 6B is one example of the time chart in the first to the fifth embodiments in the case where the nitrogen concentration in waste water is approx. 6000 ppm.

DETAILED DESCRIPTION OF THE INVENTION

The present invention will hereinbelow be described in detail in conjunction with the embodiments with reference to the drawings.

FIRST EMBODIMENT

Figure 1:
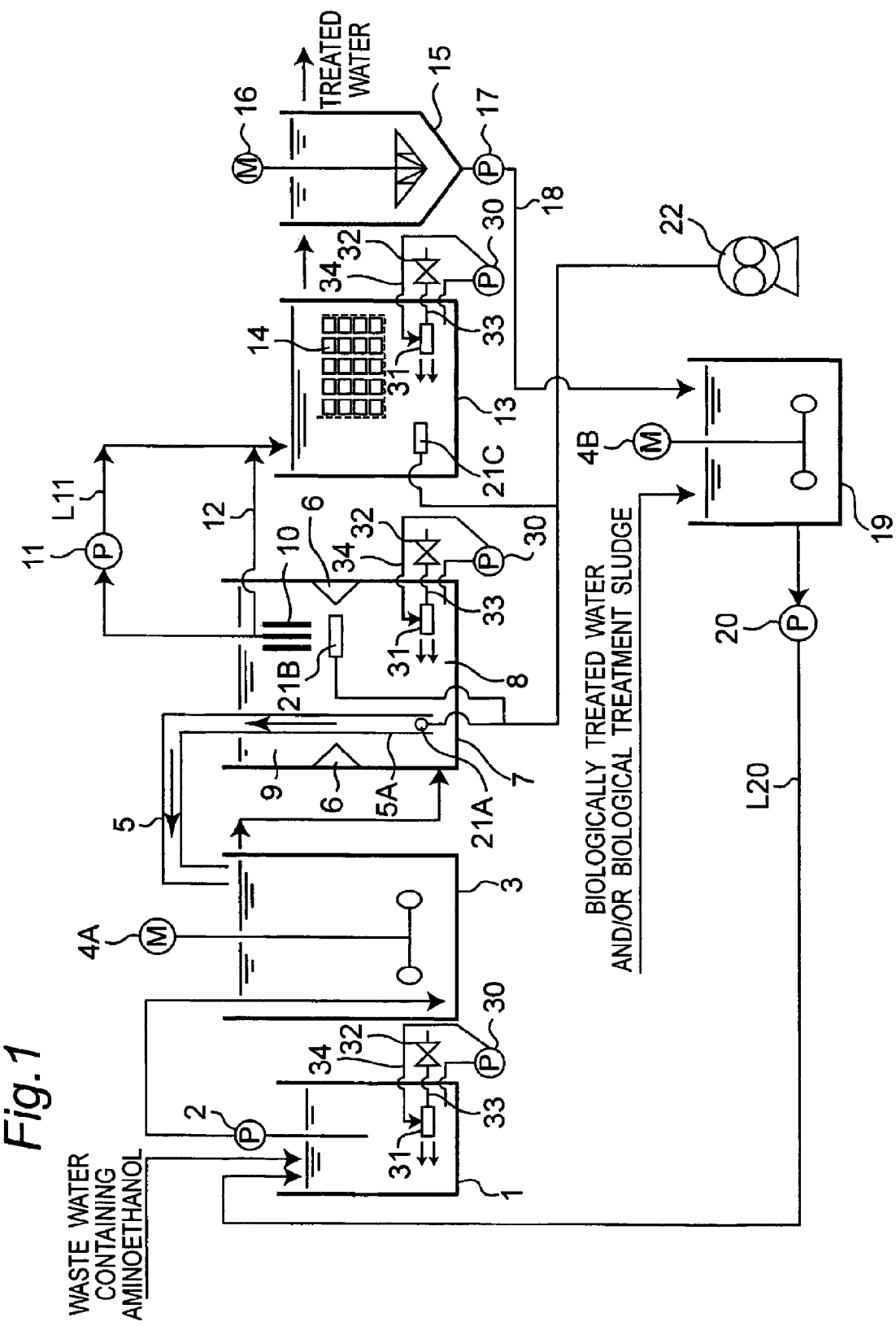
FIG. 1 is a schematic view showing a waste water treatment apparatus in a first embodiment of the present invention.

FIG. 1 is a schematic view showing a waste water treatment apparatus in a first embodiment of the present invention. In the first embodiment, the waste water treatment apparatus is provided with a raw water tank 1, a denitrification tank 3 and a reaeration tank 7. The raw water tank 1 receives waste water containing aminoethanol. The denitrification tank 3 receives treatment water from the raw water tank 1. The reaeration tank 7 has a lower semi-anaerobic section 8 and an upper aerobic section 9 for receiving treatment water from the denitrification tank 3.

In the first embodiment, the waste water treatment apparatus is also provided with a contact oxidation tank 13 and a settling tank 15. The contact oxidation tank 13 receives treatment water from the reaeration tank 7, and has oyster shell 14 as a mineral source such as calcium. The settling tank 15 receives treatment water from the contact oxidation tank 13. In the first embodiment, an air-lift pump 5 is also provided for circulating treatment water from the semi-anaerobic section 8 in the reaeration tank 7 to the denitrification tank 3.

In the first embodiment, a mineral mixing tank 19 is provided for receiving water biologically treated, sludge generated by biological treatment and mineral sludge containing calcium etc. from the settling tank 15 so as to mix the treated water with the sludge. A mineral pump 20 and a return pipe L20 are also provided, which constitute a return section for returning the sludge and the treated water from the mineral mixing tank 19 to the raw water tank 1.

In the embodiment, waste water containing aminoethanol is introduced into an upper portion of raw water in the raw water tank 1. The function of the raw water tank 1 is generally to adjust amount and quality of water, although depending on capacity of the raw water tank 1 to be installed. The sludge from the mineral mixing tank 19 is introduced into the raw water tank 1 via the return pipe L20 by the mineral pump 20. The sludge contains (1) water biologically treated and/or sludge generated during biological treatment and (2) mineral sludge containing calcium etc. which is mixed in the mineral mixing tank 19.

Upon introduction of the sludge from the mineral mixing tank 19 to the raw water tank 1, activity of all the microorganisms in each tank is promoted by micronutrients such as phosphorus, potassium, calcium and magnesium, wherein the micronutrients are contained in (1) the water biologically treated and sludge generated during biological treatment, and (2) the mineral sludge containing calcium and so on. Particularly in high concentration microbial treatment with use of a submerged membrane 10 placed in the upper aerobic section 9 of the reaeration tank 7, treatment cannot stably be achieved unless the micronutrients are contained in treatment water.

The waste water containing aminoethanol introduced into the raw water tank 1 is then introduced into the lower portion of the denitrification tank 3 by a raw water tank pump 2. The microbial concentration is higher in the lower portion of the first denitrification tank 3 than in the upper portion thereof due to gravity. Consequently, it is appropriate for the microbial treatment to introduce toxic waste water containing aminoethanol to the lower portion of the first denitrification tank 3 since this reduces stimulation to microorganisms. In the denitrification tank 3, an agitator 4A is placed for efficiently agitating the anaerobic microorganisms and waste water containing aminoethanol. The agitator 4A may be a submerged agitator placed in water instead of a general agitator for the purpose of efficiently mixing anaerobic microorganisms and waste water containing aminoethanol. However, if the microbial concentration is as high as 10000 ppm or more, dead space is generated where agitation cannot be made by general agitators or submerged agitators.

Moreover, return sludge containing microorganisms, which has been introduced from the reaeration tank 7, is introduced into the denitrification tank 3 by an air-lift pump 5. Since the submerged membrane 10 is placed in the upper aerobic section 9 of the reaeration tank 7, the microorganisms either stay in the reaeration tank 7 or are returned to the denitrification tank 3 by the air-lift pump 5.

The transfer of the return sludge by using the air-lift pump 5 is conducted by utilizing air which is supplied by a blower 22 and discharged from a diffusing pipe 21A. Therefore, a large amount of the return sludge can be transferred by small power. In other words, the transfer system with use of the air-lift pump 5 is a system of energy saving. Generally, the mechanical pump system such as a squeeze pump operated by mechanical driving force, which can secure a large pump head but requires large power compared to the air-lift pump system, cannot fall into a system of energy-saving.

The microbial sludge returned to the denitrification tank 3 returns to the reaeration tank 7 again for circulation by the second mixing tank 5. Circulating the microorganisms between both the tanks maintains the microbial concentration in both the tanks at generally the same level.

As described above, when the microbial concentration is as high as 10000 ppm or more, general agitators or submerged agitators may generate dead space where agitation is not made. On the other hand, agitation circulated by the air-lift pump system can perform agitation without generating the dead space. As the microbial concentration in both the denitrification tank 3 and the reaeration tank 7, the MLSS (Mixed Liquor Suspended Solid) content should be maintained at 10000 ppm or more. An oxidation-reduction potentiometer (unshown) is placed in the denitrification tank 3 so as to measure the level of the anaerobiotic state.

In the denitrification tank 3, nitrite nitrogen introduced from the reaeration tank 7 by the air-lift pump 5 is reduced up to nitrogen gas by anaerobic microorganisms under the presence of aminoethanol as a substitute of methanol that is a general hydrogen donor. The nitrite nitrogen is produced as a result of decomposing the aminoethanol by microorganisms in the reaeration tank 7. In the denitrification tank 3, organisms other than aminoethanol are biologically decomposed and treated by anaerobic microorganisms.

Next, treatment water flowing from the denitrification tank 3 is introduced into the lower portion of the reaeration tank 7 having the semi-anaerobic section 8. Herein, the anaerobic section is defined as a section in the state that no dissolved oxygen is present. The aerobic section is defined as a section in the state that a dissolved oxygen level is maintained at several ppm. The semi-anaerobic section is defined as a section in the state that the dissolved oxygen level is 0 ppm or about 0.5 ppm if any.

A separation wall 6 is provided on the lateral surface of the reaeration tank 7 so as to separate the upper aerobic section 9 from the lower semi-anaerobic section 8. The separation wall 6 may be constructed with concrete or made from steel. More specifically, the separation wall 4B may be made from any material. In the case of steel, however, corrosion may be generated without sufficient coating in a long period of use.

A water stream, which is generated by air discharged from a diffusing pipe 21 in the upper aerobic section 9 of the reaeration tank 7, has an influence on the lower semi-anaerobic section 8 of the reaeration tank 7 to some extent but not to large extent due to the placement of the separation wall 6. The high microbial concentration in the reaeration tank 7 makes it possible to minimize an influence of the water stream in the aerobic section 9 on the semi-anaerobic section 8 even though the size of the separation wall 6 is a degree of size as shown in FIG. 1.

According to the present embodiment, in the circulation system by using the air-lift pump 5 connected between the denitrification tank 3 and the reaeration tank 7, the semi-anaerobic section 8 is provided in the lower portion of the reaeration tank 7. Consequently, anaerobic microorganisms coming to the reaeration tank 7, together with the treatment water which has been treated by anaerobic microorganisms in the denitrification tank 3, is introduced not directly to the aerobic section 9 but to the aerobic section 9 through the semi-anaerobic section 8. This makes it possible to reduce the environmental stress on the anaerobic microorganisms coming to the reaeration tank 7 from the denitrification tank 3. Thereby, the efficiency in treating nitrogen with anaerobic microorganisms can be enhanced.

Moreover, in the reaeration tank 7, microorganisms peculiar to the semi-anaerobic section 8 propagate. Therefore, treatment water is treated there not only by anaerobic microorganisms and aerobic microorganisms but also by various microorganisms propagating in the semi-anaerobic section 8, as a result of which comprehensive treatment efficiency can be enhanced. Moreover, it has been found out that the semi-anaerobic section 8 in the reaeration tank 7 makes the microorganisms propagating in the semi-anaerobic section 8 help volume reduction of sludge. The semi-anaerobic section 8 is not provided with aeration equipment, so that aeration is not performed there. However, the semi-anaerobic section 8 is influenced to some degree by the flow of water aerated in the aerobic section 9 which is located above the semi-anaerobic section 8. The dissolved oxygen level in the semi-anaerobic section is from about 0 ppm up to 0.5 ppm even if dissolved oxygen exists there.

As shown in FIG. 1, the air-lift pump 5 includes a longitudinal pipe 5A extending from the aerobic section 9 to the vicinity of the bottom of the semi-anaerobic section 8 in the reaeration tank 7. In the air-lift pump 5, when air supplied by the blower 22 is discharged form the diffusing pipe 21A, the air as well as the return sludge simultaneously ascends in the longitudinal pipe 5A. The air-lift pump 5 can secure only a relatively small pump head in comparison with squeeze pumps or the like which use general mechanical driving force. However, the air-lift pump 5 can transfer a large amount of return sludge to the denitrification tank 3 by using small electric power. A large amount of return sludge, which is transferred to the denitrification tank 3 by the air-lift pump 5, contributes to agitation in the tank.

As described above, the submerged membrane 10 is placed in the aerobic section 9 of the reaeration tank 7. A diffusing pipe 21B is placed immediately under the submerged membrane 10. The diffusing pipe 21B is connected to the blower 22. The diffusing pipe 21B air-washes the submerged membrane 10 by discharging the air supplied from the blower 22. Two types of membrane, that is, a flat membrane and a hollow fiber membrane are commercially available as the submerged membrane 10. Either membrane may be employed.

The treatment water in the aerobic section 9 of the reaeration tank 7 naturally flows out by gravity from a gravity pipe 12 connected to the submerged membrane 10. In other words, the gravity pipe 12 delivers the treatment water by water head difference. Thereby electric power is not required, which makes it possible to conduct energy-saving operation. In the case where the discharge amount of the treatment water from the gravity pipe 12 is decreased by clogging the submerged membrane 10, a submerged membrane pump 11 connected by a pipe L11 to the submerged membrane 10 is operated. Thereby, treatment water is secured in the subsequent contact oxidation tank 13.

As a method for utilizing the submerged membrane 10 in the reaeration tank 7, it is preferable, in view of the safety operation, to concurrently adopt two types of method, specifically, the gravity pipe method and the submerged membrane pump method so as to make full use of the advantages of the respective methods for securing treatment water. When the amount of water filtrated by the submerged membrane 10 is decreased (i.e., the amount of treatment water is decreased), the submerged membrane 10 itself is cleaned with use of sodium hypochlorite or the like.

Next, the treatment water from the reaeration tank 7 is introduced into the contact oxidation tank 13 through the gravity pipe 12 and/or the submerged membrane pump 11. In the contact oxidation tank 13, a small amount of organisms remaining in the treatment water are biologically treated by a biofilm generated on the oyster shell 14. When pH of the treatment water is as low as about 6, the treatment water is neutralized by dissolving of the oyster shell 14. A diffusing pipe 21C is placed in the contact oxidation tank 13 so as to aerate the treatment water in the tank 13. Air discharged from the blower 22 is supplied to the diffusing pipe 21C in the contact oxidation tank 13.

Next, the treatment water from the contact oxidation tank 13 is introduced into the settling tank 15 which has lake 16. In the settling tank 15, the treatment water is divided into clear supernatant liquid and mineral sludge containing calcium or the like as a sediment. The clear supernatant liquid is discharged to river or retreated in plant for the recycling purpose. The reason for generation of the mineral sludge containing calcium etc. in the contact oxidation tank 13 is that the oyster shell 14 is composed of various minerals whose main component is calcium-carbonate. Upon contact between the oyster shell 14 and acid treatment water, the components of the oyster shell 14 dissolve, resulting in generation of mineral sludge containing calcium etc.

Moreover, the reason why treatment water, which has been introduced from the contact oxidation tank 13 to the settling tank 15, shows acid is that nitrogen in the waste water containing aminoethanol is oxidized to produce nitrite nitrogen which lowers the pH of the treatment water. The mineral sludge containing calcium etc. which has settled in the settling tank 15 is then transferred within a mineral sludge pipe 18 by a sludge pump 17 so as to be introduced into the mineral mixing tank 19. Further, biologically treated water and/or sludge generated during biological treatment are also introduced into the mineral mixing tank 19. An agitator 4B mix the biologically treated water and/or the sludge generated during biological treatment and the mineral sludge containing calcium etc. in the mineral mixing tank 19.

Then, after mixing the biologically treated water and/or the sludge generated during biological treatment and the mineral sludge containing calcium etc. in the mineral mixing tank 19, the mixture is introduced into the raw water tank 1 for return through the return pipe L20 by the mineral pump 20.

According to the waste water treatment apparatus in the present embodiment, as stated above, the microbial concentration in each tank is maintained high and the mineral such as calcium is added into the treatment water. Therefore, micro- organisms are more activated and waste water containing aminoethanol, which is a toxic substance for living organisms, can efficiently be treated.

In the case of the first embodiment, no micro-nano bubble generator 31 is provided in the raw water tank 1, the reaeration tank 7 and the contact oxidation tank 13. However, a modification example of the first embodiment is the case where the micro-nano bubble generator 31 is provided in the first denitrification tank 1, the reaeration tank 7 and the contact oxidation tank 13, as shown in FIG. 1.

In this modification example, the micro-nano bubble generator 31 is placed in the raw water tank 1, and the micro-nano bubble generator 31 is connected to an air suction pipe 33 and an introduction pipe 34. The air suction pipe 33 is connected to a valve 32. The valve 32 adjusts air introduced from the air suction pipe 33 to the micro-nano bubble generator 31. The introduction pipe 34 is connected to a circulating pump 30. The circulating pump 30 introduces the treatment water in the raw water tank 1 into the micro-nano bubble generator 31 through the introduction pipe 34. In a specific example, the treatment water in the raw water tank 1 is conveyed to the micro-nano bubble generator 31 by the circulating pump 30 at the pressure of $1.5 kg/cm^2$ or more. At the same time, while air flow is adjusted by the valve 32, air is introduced through the air suction pipe 33 into the micro-nano bubble generator 31 so as to efficiently generate micro-nano bubbles from the micro-nano bubble generator 31. The raw water tank 1 precedes the denitrification tank 3. A small-size type of the micro-nano bubble generator 31 is selected since only a small amount of micro-nano bubbles is necessary. This is because a large amount of the micro-nano bubbles in the raw water tank 1 hinder maintaining the anaerobic state in the subsequent denitrification tank 3.

In the above-stated modification example, a plurality of the micro-nano bubble generators 31, which are identical to the micro-nano bubble generator 31 in the raw water tank 1, are placed in the semi-anaerobic section 8 of the reaeration tank 7 in accordance with capacity of the reaeration tank 7. In one preferred embodiment, the contact oxidation tank 13 has twice the number of the micro-nano bubble generators 31 placed in the reaeration tank 7, wherein the micro-nano bubble generators 31 are identical to the micro-nano bubble generator 31 placed in the raw water tank 1. This is because a large amount of micro-nano bubbles are required in the contact oxidation tank 13 so as to form microbial films on the surfaces of the oyster shells 14 which are a natural product.

Thus, in the modification example, the micro-nano bubble generators 31 are placed in the raw water tank 1, the reaeration tank 7 and the contact oxidation tank 13, and therefore it becomes possible to enhance the efficiency of biological treatment in each of the tanks.

In the above embodiment, the micro-nano bubble generator 31 may be placed in any one or two of the raw water tank 1, the reaeration tank 7 and the contact oxidation tank 13.

SECOND EMBODIMENT

Figure 2:
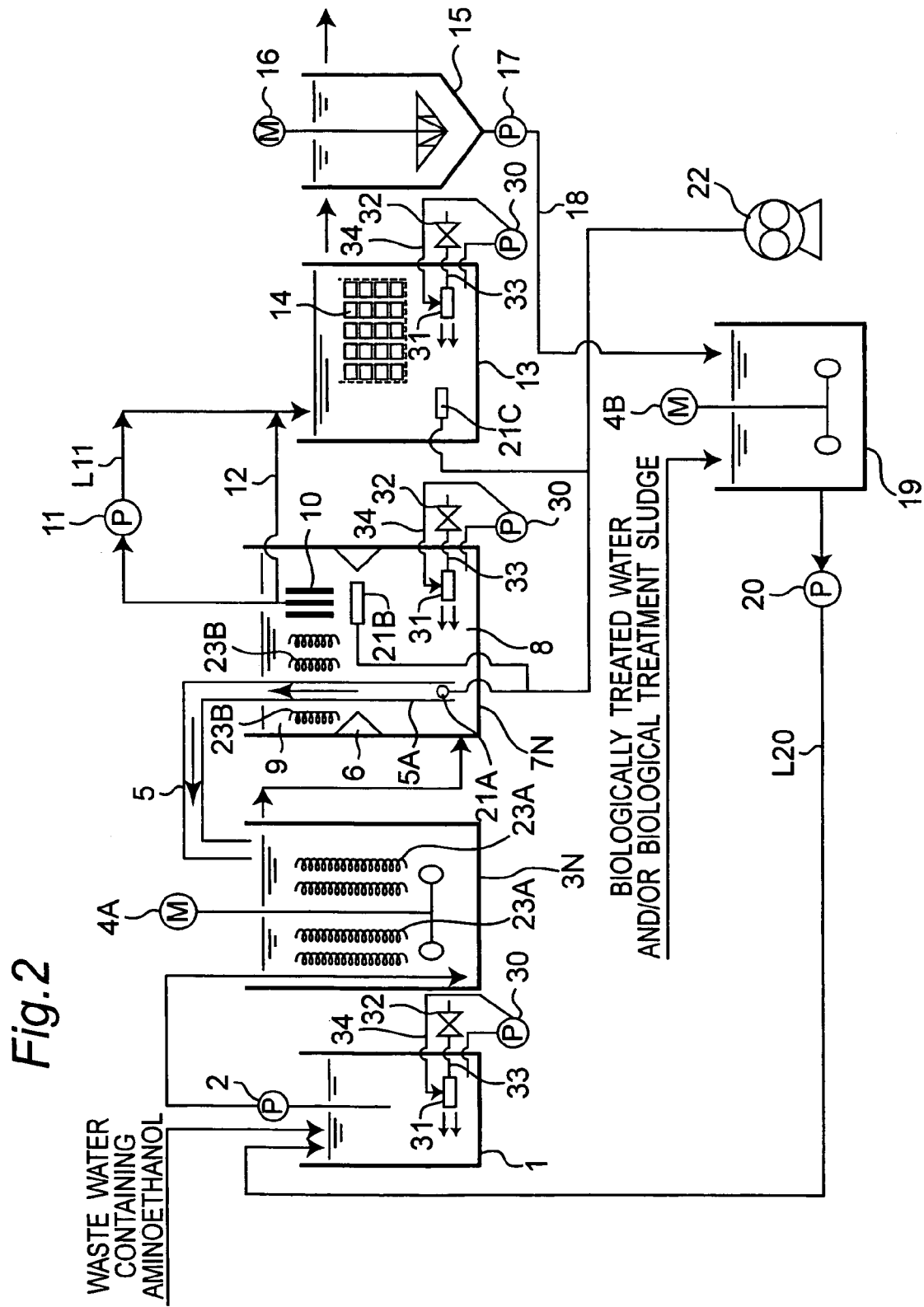
FIG. 2 is a schematic view showing a waste water treatment apparatus in a second embodiment of the present invention.

FIG. 2 shows a waste water treatment apparatus in a second embodiment of the present invention. In the first embodiment, the denitrification tank 3 and the aerobic section 9 of the reaeration tank 7 are not filled with any filler material. In the second embodiment, on the other hand, a denitrification tank 3N and an aerobic section 9 of a reaeration tank 7N are filled with polyvinylidene chloride filler material 23A, 23B as a filler material. In the second embodiment, therefore, the component members identical to those in the first embodiment are designated by identical reference numerals, and their detailed description is omitted. Only parts different from the first embodiment will be described.

In the second embodiment, the denitrification tank 3N and the aerobic section 9 in the reaeration tank 7N are respectively filled with the polyvinylidene chloride filler materials 23A, 23B. Thereby, it becomes possible to enhance the efficiency of decomposing aminoethanol and treating nitrogen in the waste water containing aminoethanol. More specifically, the presence of the polyvinylidene chloride filler materials 23A, 23B makes higher the microbial overall-average concentration in the denitrification tank 3N and the aerobic section 9 of the reaeration tank 7N than in the case of no filler materials. In addition, microorganisms are attached onto the polyvinylidene chloride filler materials 23A, 23B, so that microorganisms propagate thereon. Therefore, the microorganisms are more stabilized than in the case of no filler material. As the result, it becomes possible to enhance the capabilities of decomposing aminoethanol and treating nitrogen. It is more desirable to place the polyvinylidene chloride filler materials 23A, 23B entirely in the denitrification tank 3N and the reaeration tank 7N because the microbial concentration becomes higher in the whole tanks 3N, 7N.

Also, when the polyvinylidene chloride filler material 23A is present, anaerobic level (measured as oxidation-reduction potential) in the denitrification tank 3N is increased in comparison with the case where the polyvinylidene chloride filler material 23A is absent. Thus, the polyvinylidene chloride filler material 23A promotes a denitrification reaction.

Microorganisms propagate on the polyvinylidene chloride filler materials 23A, 23B as time advances starting from a test run of the waste water treatment apparatus. The microbial concentration on the surface of the polyvinylidene chloride filler materials 23A, 23B reaches 30000 ppm or more, which contributes to increase in decomposition efficiency of aminoethanol and treatment efficiency of nitrogen. The polyvinylidene chloride filler materials 23A, 23B can be semipermanently used since polyvinylidene chloride is solid and resistant to chemical substances. Products named Bio Code, Ring Lace, Bio Multi Leaf and Bio Module are available as the polyvinylidene chloride filler materials 23A, 23B. Those products are selected depending on properties of waste waters.

In the denitrification tank 3N, the nitrite nitrogen in treatment water, which is returned from the semi-anaerobic section 8 in the reaeration tank 7N by the air-lift pump 5, is reduced to nitrogen gas for treatment of nitrogen. In the upper aerobic section 9 of the reaeration tank 7N, aminoethanol in the treatment water is oxidatively decomposed by aerobic microorganisms so as to change into nitrate nitrogen and nitrite nitrogen.

THIRD EMBODIMENT

Figure 3:
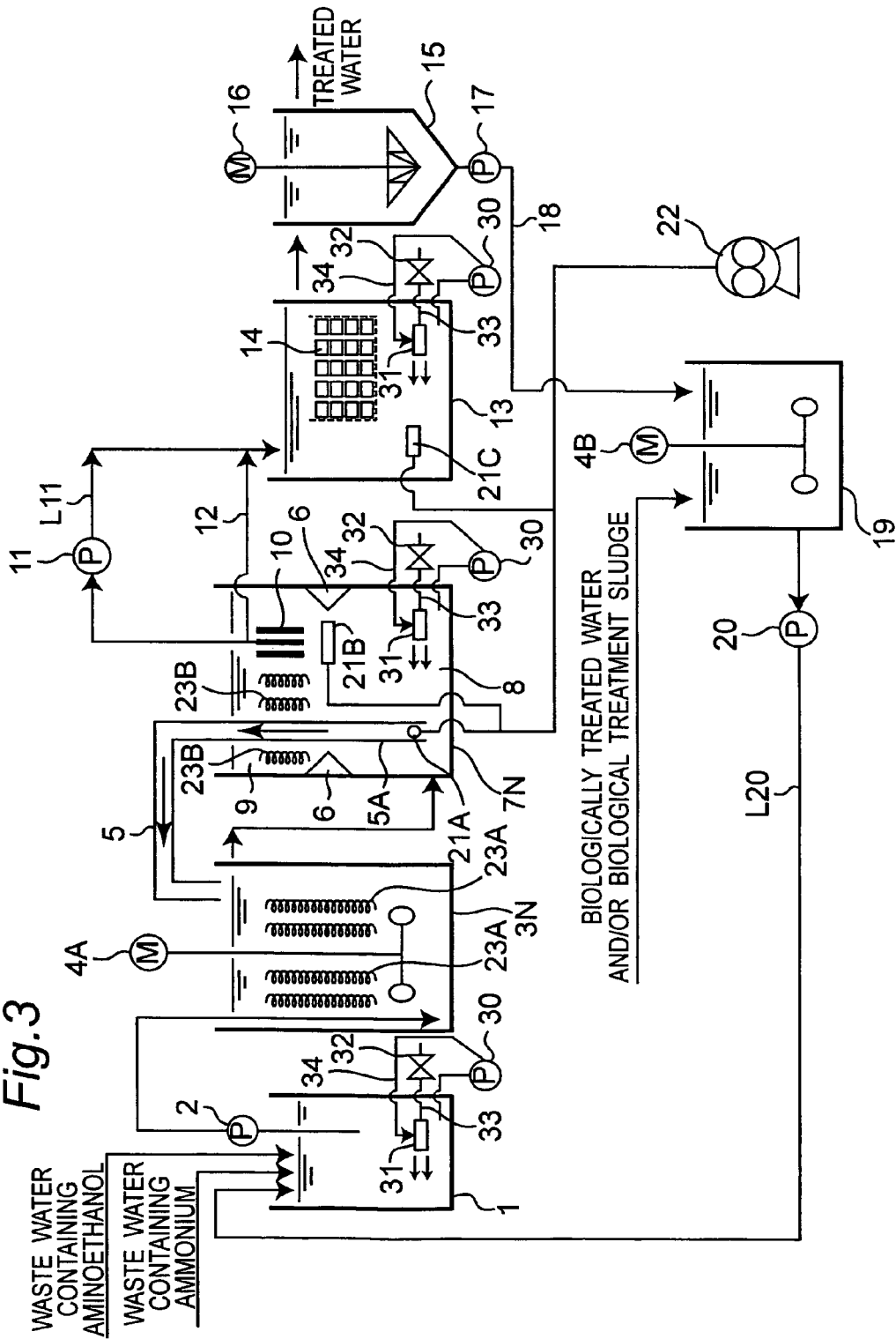
FIG. 3 is a schematic view showing a waste water treatment apparatus in a third embodiment of the present invention.

FIG. 3 shows a waste water treatment apparatus in a third embodiment of the present invention. In the second embodiment, waste water introduced into the raw water tank 1 was only the waste water containing aminoethanol. In the third embodiment, on the other hand, both the waste water containing aminoethanol and waste water containing ammonium are introduced into the raw water tank 1. In the third embodiment, therefore, the component members identical to those in the second embodiment are designated by identical reference numerals, and their detailed description is omitted. Only parts different from the second embodiment will be described.

In the third embodiment, as in the case of the second embodiment, the microbial concentration is increased to 10000 ppm or more with use of a submerged membrane 10 as a treatment method in a reaeration tank 7N. Also, a denitrification tank 3N is filled with a polyvinylidene chloride filler material 23A while the reaeration tank 7N is filled with a polyvinylidene chloride filler material 23B. In the third embodiment, therefore, it becomes possible to treat waste water containing aminoethanol with microbial toxicity as in the case of the second embodiment. Also, in the third embodiment, it is possible to microbially treat both anaerobic microorganisms and aerobic microorganisms as in the case of the second embodiment, so that it is naturally possible to treat waste water containing other nitrogen sources. More specifically, according to the third embodiment, it is also possible to treat the waste water containing aminoethanol discharged from semiconductor plants. In the third embodiment, a single waste water treatment apparatus treats two kinds of waste water: waste water containing aminoethanol and waste water containing ammonium, so that initial costs and running costs can be reduced.

FOURTH EMBODIMENT

Figure 4:
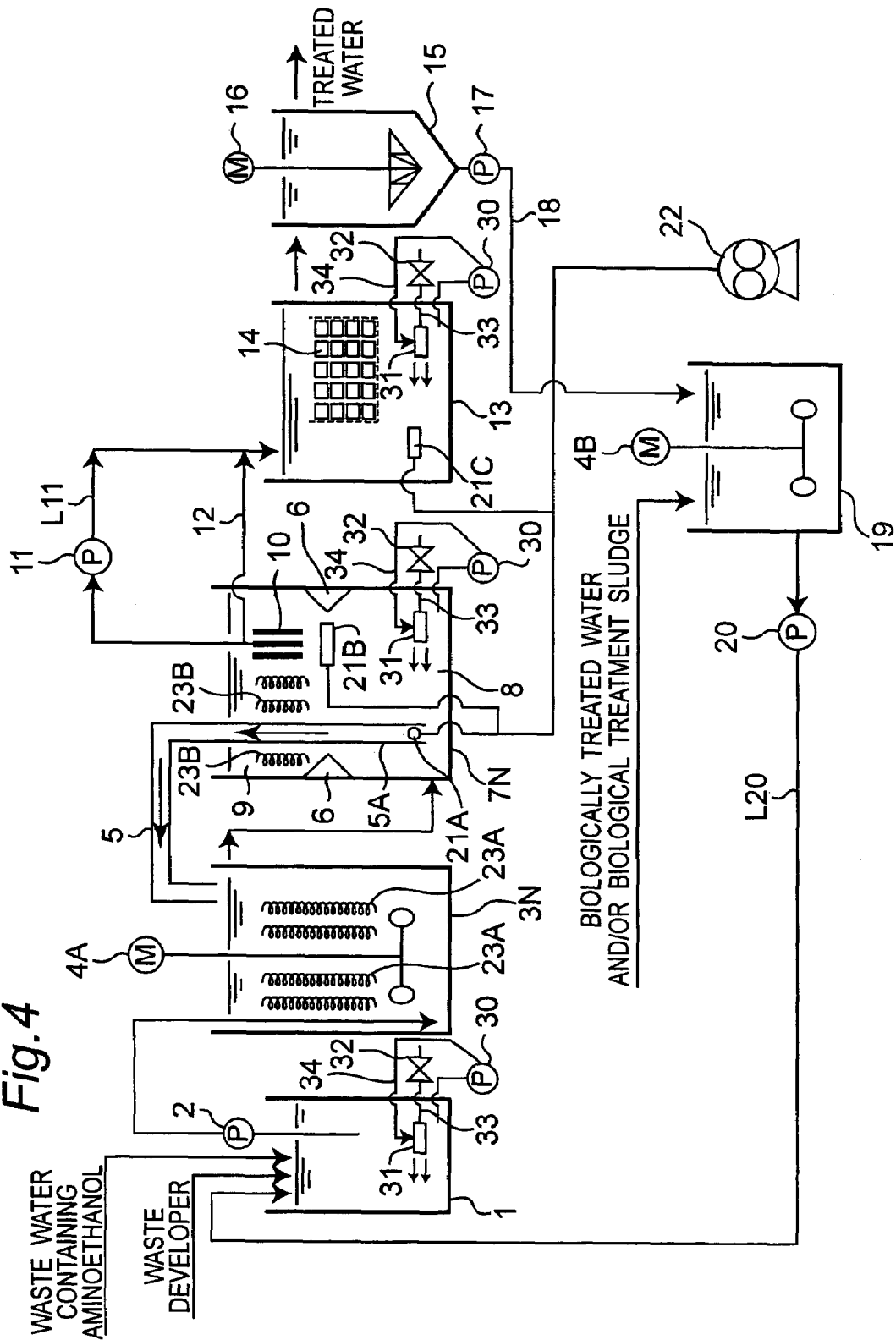
FIG. 4 is a schematic view showing a waste water treatment apparatus in a fourth embodiment of the present invention.

FIG. 4 shows a waste water treatment apparatus in a fourth embodiment of the present invention. In the second embodiment, waste water introduced into the raw water tank 1 is only the waste water containing aminoethanol. On the other hand, in the fourth embodiment, both the waste water containing aminoethanol and waste developer are introduced into the raw water tank 1. In the fourth embodiment, therefore, the component members identical to those in the second embodiment are designated by identical reference numerals, and their detailed description is omitted. Only parts different from the second embodiment will be described.

In the fourth embodiment, as in the case of the second embodiment, it is possible to treat waste water containing aminoethanol with microbial toxicity. In the fourth embodiment, as in the case of the second embodiment, the microbial concentration is increased to 10000 ppm or more with use of a submerged membrane 10 as a treatment method in a reaeration tank 7N. Also, a denitrification tank 3N and the reaeration tank 7N are filled with polyvinylidene chloride filler materials 23A, 23B. In the fourth embodiment, therefore, it is possible to microbially treat both anaerobic microorganisms and aerobic microorganisms as in the case of the second embodiment, so that waste water containing other nitrogen sources can naturally be treated. More specifically, according to the fourth embodiment, it is also possible to treat waste developer discharged from semiconductor plants, where the main component of the waste developer is a nitrogen compound such as tetramethylammonium hydroxide. According to the fourth embodiment, a single waste water treatment apparatus treats two kinds of waste water, that is, waste water containing aminoethanol and waste developer, so that initial costs and running costs can be reduced.

FIFTH EMBODIMENT

FIG. 5 shows a waste water treatment apparatus in a fifth embodiment of the present invention. In the second embodiment, waste water introduced into the raw water tank 1 is only the waste water containing aminoethanol. In the fifth embodiment, on the other hand, both the waste water containing aminoethanol and dimethylformamide waste liquid are introduced into the raw water tank 1. In the fifth embodiment, therefore, the component members identical to those in the second embodiment are designated by identical reference numerals, and their detailed description is omitted. Only parts different from the second embodiment will be described.

In the fifth embodiment, as in the case of the second embodiment, it is possible to treat waste water containing aminoethanol. The microbial concentration is increased to 10000 ppm or more with use of a submerged membrane 10 as a treatment method in a reaeration tank 7N. A denitrification tank 3N and the reaeration tank 7N are filled with polyvinylidene chloride filler materials 23A, 23B. In the fourth embodiment, therefore, it is possible to microbially treat both high concentration anaerobic microorganisms and aerobic microorganisms as in the case of the second embodiment, so that waste water containing other nitrogen sources can naturally be treated. More specifically, according to the fifth embodiment, it is also possible to treat dimethylformamide waste liquid, which is a nitrogen compound waste liquid discharged from semiconductor plants. The dimethylformamide contained in the dimethylformamide waste liquid is a toxic first-class designated chemicals in PRTR (Pollutant Release and Transfer Register) Law. According to the fifth embodiment, a single waste water treatment apparatus treats two kinds of waste water, that is, waste water containing aminoethanol and dimethylformamide waste liquid, so that initial costs and running costs can be reduced.

In the second to the fifth embodiments, descriptions have been given of the case where a micro-nano bubble generator 31 is not placed. As in the case of the modification example of the first embodiment, however, the micro-nano bubble generators 31 may be placed respectively in the first denitrification tank 1, the reaeration tank 7N and the contact oxidation tank 13, so that the efficiency of microbial treatment can be enhanced. Instead, in the second to the fifth embodiments, the micro-nano bubble generator 31 may be placed in any one or two of the raw water tank 1, the reaeration tank 7N and the contact oxidation tank 13.

EXPERIMENTAL EXAMPLE

An experimental apparatus was made which is structurally identical to that in the second embodiment as shown in FIG. 2. In the experimental apparatus, the raw water tank 1 has a capacity of 50 L, the denitrification tank 3N has a capacity of 100 L, the reaeration tank 7N has a capacity of 200 L, the contact oxidation tank 13 has a capacity of 100 L, and the settling tank 15 has a capacity of 50 L.

Microorganisms had been cultured in the experimental apparatus for two months so as to get a microbial concentration of 17600 ppm. Waste water containing aminoethanol (treatment water having an aminoethanol concentration of 2760 ppm), which was discharged from production equipment in a plant, was collected to be continuously introduced into the raw water tank 1. The concentration of aminoethanol in the treated water, which water was obtained from the settling tank 15, was measured after one month elapsed for stabilization in water quality. The measured value of aminoethanol concentration was 12 ppm.

FIG. 6A is a time chart showing an example of a residence time of waste water in each tank in the first to fifth embodiments in the case where the waste water introduced into the raw water tank 1 has a nitrogen concentration of approx. 3000 ppm. FIG. 6B is a time chart showing an example of a residence time of waste water in each tank in the first to fifth embodiments in the case where the waste water introduced into the raw water tank 1 has a nitrogen concentration of approx. 6000 ppm.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

The invention claimed is:

1. A waste water treatment apparatus, comprising:
   a raw water tank for receiving waste water containing aminoethanol;
   a denitrification tank for receiving treatment water from the raw water tank;
   a reaeration tank for receiving treatment water from the denitrification tank and having a semi-anaerobic section;
   a contact oxidation tank for receiving treatment water from the reaeration tank and having a mineral source containing calcium;
   a settling tank for receiving treatment water from the contact oxidation tank;
   an air-lift pump for circulating treatment water from the reaeration tank to the denitrification tank;
   a mineral mixing tank for receiving biologically treated water and/or sludge generated by biological treatment and mineral sludge containing calcium from the settling tank and for mixing the treated water and the mineral sludge; and
   a return section for returning the sludge and the treated water from the mineral mixing tank to the raw water tank.

2. The waste water treatment apparatus as set forth in claim 1, wherein
   the reaeration tank has
   a submerged membrane,
   a pump-type pipe for introducing treatment water from the submerged membrane to the contact oxidation tank, and
   a gravity-type pipe for introducing treatment water from the submerged membrane to the contact oxidation tank.

3. The waste water treatment apparatus as set forth in claim 1, wherein
   the denitrification tank and the reaeration tank have a polyvinylidene chloride filler material.

4. The waste water treatment apparatus as set forth in claim 1, wherein
   the air-lift pump returns sludge from the semi-anaerobic section in the reaeration tank to the denitrification tank.

5. The waste water treatment apparatus as set forth in claim 1, wherein
   at least one of the raw water tank, the reaeration tank and the contact oxidation tank is equipped with a micro-nano bubble generator.

6. A waste water treatment method, comprising the steps of:
   introducing waste water containing aminoethanol to a raw water tank, a denitrification tank, a reaeration tank having a semi-anaerobic section, a contact oxidation tank and a settling tank in sequence;
   circulating treatment water by an air-lift pump from the reaeration tank to the denitrification tank; and
   mixing biologically treated water and/or sludge generated by biological treatment and mineral sludge containing calcium from the settling tank in a mineral mixing tank, and returning a resultant mixture to the raw water tank.

7. The waste water treatment method as set forth in claim 6, wherein
   waste water containing aminoethanol and waste water containing ammonium are introduced into the raw water tank.

8. The waste water treatment method as set forth in claim 6, wherein
waste water containing aminoethanol and developer waste liquid are introduced into the raw water tank.

9. The waste water treatment method as set forth in claim 6, wherein
wherein waste water containing aminoethanol and dimethylformamide waste liquid are introduced into the raw water tank.

* * * * *